United States Patent [19]
Walsh

[11] Patent Number: 5,263,043
[45] Date of Patent: Nov. 16, 1993

[54] FREE ELECTRON LASER UTILIZING GRATING COUPLING

[75] Inventor: John E. Walsh, Bradford, Vt.

[73] Assignee: Trustees of Dartmouth College, Hanover, N.H.

[21] Appl. No.: 864,364

[22] Filed: Apr. 6, 1992

Related U.S. Application Data

[63] Continuation of Ser. No. 713,958, Jun. 11, 1991, abandoned, which is a continuation-in-part of Ser. No. 576,362, Aug. 31, 1990, abandoned.

[51] Int. Cl.$^5$ .............................................. H01S 3/09
[52] U.S. Cl. ...................................... 372/102; 372/2; 372/4; 372/74
[58] Field of Search ...................... 372/2, 74, 4, 96, 92, 372/102

[56] References Cited

U.S. PATENT DOCUMENTS

| | | | |
|---|---|---|---|
| 2,634,372 | 10/1949 | Salisbury | 250/36 |
| 4,122,372 | 10/1978 | Walsh | 315/5 |
| 4,298,824 | 11/1981 | Walsh | 315/4 |
| 4,530,096 | 7/1985 | Bekefi et al. | 372/4 |
| 4,538,275 | 8/1985 | Szu | 372/4 |
| 4,727,550 | 2/1988 | Chang et al. | 372/2 |
| 4,874,953 | 10/1989 | Katz | 372/4 |

OTHER PUBLICATIONS

AIP Conference Proceedings 184 "Physics of Particle Accelerators", American Institute of Physics, New York, 1989.
Garate et al. (1988) Nucl. Instruments Meths. Physics Res. A272, pp. 129–131.
Marshall et al. (Apr. 1988) IEEE Transactions on Plasma Sci. 16:199–205.
Walsh et al. (1988) Nuclear Instruments Meths. Physics Res. A272, pp. 132–135.
Ciocci et al. (1987) Nuclear Instruments Meths. Physics Res. A259, pp. 128–132.
Garate et al. (1987) Nuclear Instruments Meths. Physics Res. A259, pp. 125–127.
Walsh et al. (1987) Free-Electron Lasers, SPIE vol. 738, pp. 70–82.
Garate et al, (May 1986) Amer. Inst. Physics, Appl. Lett. 48, pp. 1326–1328.
Walsh et al. (Jun. 5–6, 1986) Far-Infrared Sci. Technol. SPIE vol. 666, pp. 22–27.
Walsh et al. (1986) AIP Conference Proceedings 146, pp. 120–123.
Garate et al. (Jul. 1985) J. Appl. Phys. 58:627–635.
Walsh et al. (Jul. 1985) IEEE J. Quantum Electronics QE-21:920–923.
Walsh et al. (Jun. 26–Jul. 2, 1983) SPIE Conf. Proceedings 453:376–379.
Walsh et al. (Aug. 1982) IEEE J. Quantum Electronics QE-18, pp. 1259–1264.
Walsh (1982) Advances Electronics Electron Physics, vol. 58.
Mizuno et al. (Aug. 1973) IEEE Trans. Elect. Dev. ED-20, pp. 749–752.
Rusin et al. (Apr. 1969) Proc. IEEE 57:720–722.
Salisbury (Oct. 1966) Science 154:386–388.
Smith et al. (1953) Phys. Rev. 92:1069.
Ciocci et al. (1986) Abstract "The Microtron FEL Cherenkov: theoretical and experimental aspects", Amer. Inst. Physics, pp. 124–125.

Primary Examiner—James W. Davie
Attorney, Agent, or Firm—Lahive & Cockfield

[57] ABSTRACT

Free electron laser apparatus, for producing coherent electromagnetic radiation within a spectral range extending from millimeter to visible wavelengths, includes elements for generating an electron beam and for directing the beam to move over the surface of a diffraction grating, thereby producing electromagnetic radiation. Optical or quasi-optical elements confine the electromagnetic radiation to generate feedback, resulting in stimulated, coherent emission.

15 Claims, 10 Drawing Sheets

FREE ELECTRON LASER UTILIZING GRATING COUPLING

REFERENCE TO RELATED APPLICATIONS

This application is a continuation of application Ser. No. 713,958, filed Jun. 11, 1991, now abandoned, which is a continuation-in-part of Ser. No. 576,362, filed Aug. 31, 1990, now abandoned.

BACKGROUND OF THE INVENTION

This invention relates generally to apparatus and methods for generating coherent electromagnetic radiation, and, more particularly, relates to free electron lasers (FEL) for generating coherent radiation over a range of wavelengths, including far infra-red (FIR) submillimeter regions.

The importance of a versatile and convenient FIR submillimeter source is a direct consequence of the large range of research opportunities and technical applications associated with this spectral region. Examples of such opportunities are found in spectroscopy and in other areas of technology development.

Spectroscopy applications include surface science, condensed-matter phenomena, excitations in high critical temperature superconductors, laser chemistry, radio astronomy, diagnostics in thermonuclear plasmas, conformational excitations in biomolecules, and gas phase spectroscopy. Technology development activities include submillimeter radar, radar modeling, countermeasures for FIR systems, space communications, compact high-gradient accelerator research, plasma heating, and isotope separation.

In view of the importance of this spectral range, considerable effort has been expended in developing new sources. Increased source power automatically provides greater signal-to-noise ratio, and, if stability is adequate, better resolution. Furthermore, the study and exploitation of nonlinear and transient processes that are not possible with low-power sources now become accessible options. Thus, recent years have seen new additions to the class of FIR submillimeter sources, including microwave tubes, impatt diodes, gyrotrons, FIR lasers, FELS, and Smith-Purcell devices.

Microwave Tubes

Conventional microwave tubes such as the magnetron, the klystron and the traveling-wave tube amplifier are widely used for moderate and high-power applications in the centimeter-wavelength region. However, most of these designs encounter fundamental limitations in operation at shorter wavelengths, particularly in the sub-millimeter regime.

Impatt Diodes

Impatt diodes can be used to produce low levels of power in the submillimeter regime. However, these systems are usually delicate and difficult to use. Furthermore, the power is extremely low—typically less than one milliwatt—and it may not be possible to extend their operation into the FIR regime.

Gyrotrons

The gyrotron is a relatively new entry to the coherent source population that can provide high power in certain frequency ranges. Again, however, as the operating wavelength approaches one millimeter, gyrotrons encounter fundamental limitations, and it is not yet clear whether operation at submillimeter to FIR wavelength is possible.

FIR Lasers

The FIR laser is the most widely-used FIR source, in part because it can provide high levels of pulsed power. The optically pumped FIR laser, however, lacks tunability. In applications where tunability is required, the OP-FIR laser is of use only in rare instances of a near-coincidence of wavelength.

Free-Electron Lasers

Conventional free-electron lasers employ a spatially-periodic magnetic field, or undulator, to couple a highly-relativistic electron beam to the electromagnetic field. Tuning the wavelength of these devices is not straightforward. At high beam energy, substantial accelerator realignment is required. Moreover, extension of conventional FELs to longer wavelengths with the highly energetic beam drive is problematic, requiring a long period and thus a long-interaction-length undulator. This is expensive and cumbersome. Electrostatic accelerator-driven FEL's also operate in the submillimeter/FIR region. However, these devices are large and expensive, and are available only as a user-facility-based source.

Smith-Purcell Lasers

Figure 1:
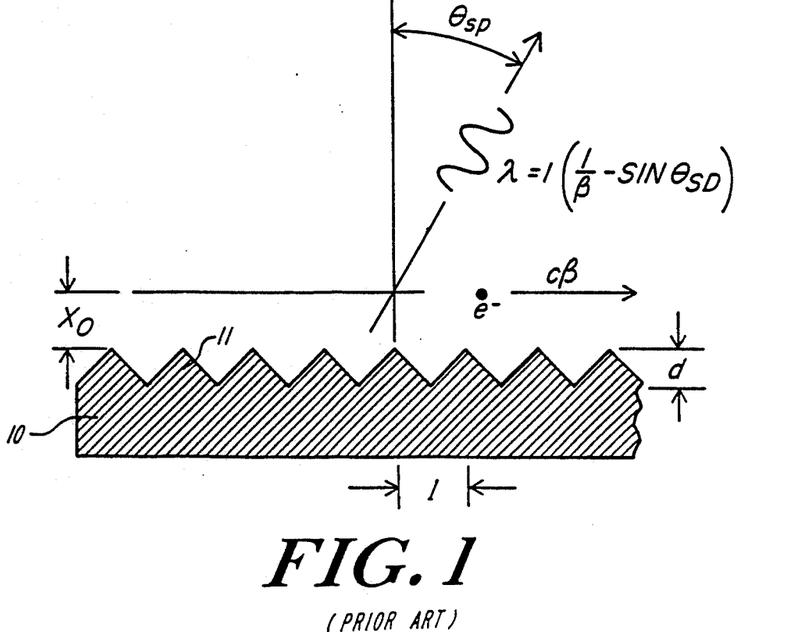
FIG. 1 depicts a prior art Smith-Purcell configuration.

Certain researchers have suggested, in general terms, that a useful oscillator might be produced by adding feedback elements to beam/grating configurations demonstrated by Smith and Purcell. In 1953, Smith and Purcell generated incoherent radiation at visible wavelengths by using a finely-focused electron beam propagating over a metal grating at grazing incidence, as schematically depicted in FIG. 1. U.S. Pat. No. 2,634,372 of Salisbury, issued 7 Apr. 1953, also describes such an emission process.

Early research efforts in this area were devoted to determining the spectral content of the radiation produced by the configuration exemplified by FIG. 1. With reference to FIG. 1, the equation below expresses the theoretically-predicted relationship between the wavelength of the emitted radiation X, the grating period P, the relative electron velocity B, and the angle of emission T:

$$X = P(1/B - \sin T)$$

The validity of this equation was verified in the first Smith-Purcell experiments, and reconfirmed in a number of subsequent works. Subsequent researchers have also noted the relation between this radiation and specular reflection from a grating.

However, in experiments demonstrating process described above, referred to as the Smith-Purcell effect, optical feedback elements are not employed, and beam current densities typically are insufficient to produce significant amplification of the spontaneous emission. As a result, the incoherent or spontaneous component of the emission is dominant, and the illustrated configuration is not applicable as a coherent radiation source.

The underlying similarity between gratings and other periodic structures employed as coupling elements in microwave tubes, such as coupled cavities or helices, has prompted researchers to suggest, in general terms, that feedback elements might be added to the beam/grating combination to produce an oscillator. Such configurations are sometimes referred to as Smith-Purcell lasers. However, little attention has been given to the optical design requirements for achieving a critical coupling strength and an acceptable level of output power.

One class of Smith-Purcell devices that attempted to increase output power is referred to as an Orotron or Ledatron. Two Orotron configurations have been investigated in detail. An apparatus developed by Rusin et al., and later studied by Mizuno et al. and Wortman et al., utilizes a spherical mirror opposed to a planar grating. This is illustrated schematically in FIG. 2. An electron beam passing over the grating surface drives a surface wave with 2n(pi) phase shift per grating period. The wave/grating interaction forms a periodic array of radiators which in turn drive the Fabry-Perot modes of the resonator formed by the spherical mirror/grating combination. The device, which Rusin and Wortman termed the Orotron, and which Mizuno described as a Ledatron, has been operated primarily at millimeter wavelengths. Mizuno observed emission at angles other than the normal to the grating, but he did not address effective positioning of the feedback element.

Figure 3A:
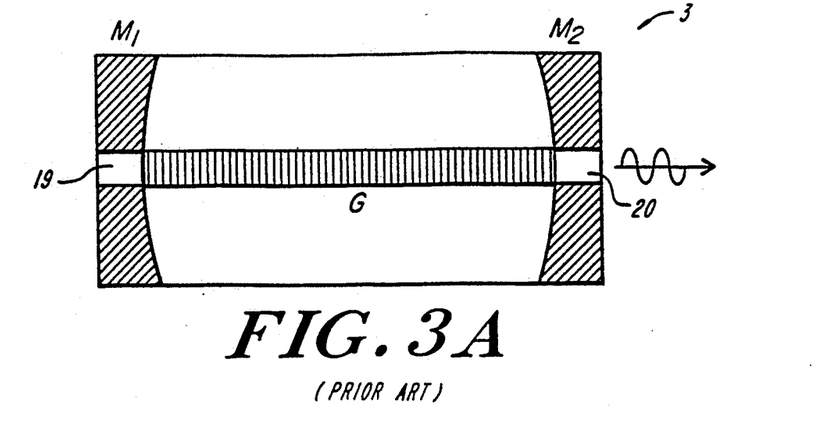
FIGS. 3A and 3B depict prior art planar Orotrons.
Figure 3B:
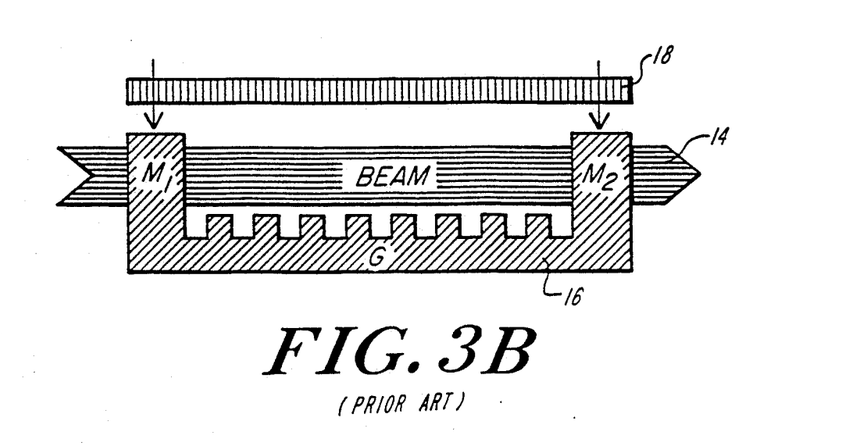

In another Orotron experiment, Walsh et al. have examined a resonator structure formed by a parallel plate waveguide having open sides and axial terminations. This arrangement is depicted in FIGS. 3A and 3B. In this configuration, referred to as a planar Orotron, the terminations are cylindrical section mirrors having beam entrance and exit apertures. A narrow strip grating embedded along the axis of the structure couples the electron beam traversing the axis with the electromagnetic modes of the resonator. The radiation output is coaxial with the beam. The planar geometry of this planar Orotron resonator enables phase shifts per period other than n(pi) to be effectively employed.

The sources described above, however, have deficiencies that restrict their utility as FIR submillimeter sources. Conventional microwave tubes, impatt diodes, gyrotrons, and FIR lasers, for example, fail to provide acceptable power output at the frequency ranges of interest. Conventional FEL are large, cumbersome, and expensive; and typical electron beam/grating arrangements do not achieve a critical coupling strength and useful level of output power.

It is accordingly an object of the invention to provide improved free electron laser methods and apparatus that are capable of operating as sources of coherent electromagnetic radiation in the FIR submillimeter range.

Another object of the invention is to provide tunable FEL devices that are capable of generating coherent radiation over a wide range of wavelengths, including operation in the sub-millimeter and far infrared spectral region.

It is a further object of the invention to provide FEL feedback techniques and apparatus that enhance the stimulated, and hence coherent, component of the emitted radiation.

Another object of the invention is to provide FEL devices that are compact in size, produce substantial output power, and have enhanced frequency stability.

Other general and specific objects of the invention will in part be obvious and will in part appear hereinafter.

SUMMARY OF THE INVENTION

The foregoing objects are attained by the invention, which provides FEL methods and apparatus for producing coherent electromagnetic radiation in a spectral range which extends from millimeter to visible wavelengths. The FEL apparatus includes elements for generating an electron beam and for directing the beam to propagate over the surface of a diffraction grating. In accord with the invention, the radiation thus generated is confined by optical or quasi-optical field confinement elements.

In one aspect of the invention, the diffraction grating includes a cylindrical section having integral mirrors and output coupler elements. In another aspect of the invention, the FEL utilizes a planar-section open grating, and the confinement is provided by external mirrors.

The invention can employ open cylindrical section or planar grating resonators with external coupling elements such as additional gratings, prisms, or mirrors to effect confinement or output coupling.

A further aspect of the invention includes a cylindrical section grating opposed by a parallel, smooth cylindrical section guide, wherein mirror elements are integrated with the grating.

The FEL can also utilize a first cylindrical-section guide partially covered by an opposing cylindrical-section guide, wherein the partially covered section of the first guide is employed as an output coupler. Alternatively, two uncovered sections can be utilized, where one is used as an input coupler for an amplifier.

The invention can also employ first and second opposing cylindrical-section grating guides in which the opposing gratings are in registration, or selectively offset. Alternatively, the FEL can incorporate an open grating with a single opposing mirror in a Littrow configuration or an open grating with a first and second opposing mirrors in a complementary Littrow configuration.

In another aspect of the invention, an open diffraction grating element is used in a ring resonator configuration. Multiple sections of open-grating resonators can be used as wave supporting structures for short-wavelength analogues of klystron amplifiers or oscillators.

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and the accompanying drawings, in which:

FIGS. 8A-8D depict an external-mirror open resonator and its associated dispersion plane;

DESCRIPTION OF ILLUSTRATED EMBODIMENTS

Theory of GCO/GCA Operation

The physical principles governing conventional periodic coupling structures also control the interaction of the electron beam and the electromagnetic fields in GCO or GCA devices constructed in accord with the invention. Thus, understanding of the embodiments depicted in FIGS. 4A-18B may be obtained by reference to the conventional diffraction grating structures depicted in FIGS. 1-3B.

The following symbols are used in connection with FIGS. 1-18B:

The Beam $V_b$—Beam voltage
$I_b$—Beam current
$J_b$—Beam current density
B—The velocity of a beam electron relative to the speed of light (c)
Y-1—The relative kinetic energy of a beam electron $\{Y=(1-B^2)^{.5};\ Y-1=eV_b/mc^2;\ e=$the electron charge, mc is the electron mass, c is the speed of light$\}$
$S_{bx}$—Beam thickness in the direction normal to the grating
$S_{by}$—Beam width across the grating
G—Gap between the beam and the grating surface

The Grating

P—The grating period
d—The modulation depth of the grating
s—The slot width in a rectangular profile grating
2T—The opening angle of a triangular profile grating
$T_{1,2}$—The opening angles for a blazed grating
$T_b$—The blaze angle of a blazed grating
L—The interaction length for the beam on the grating

The Electromagnetic Field

W—The angular frequency of an electromagnetic normal mode on the grating
m—The Floquet zone index number $\{(\text{infinity})\leq m\leq(\text{infinity})\}$
$K_o$—The axial wave number in the principle (m=0) zone
$K_m$—The axial wave number of the mth space harmonic $(SH)_m$ $(K_m=K_o+2m(\text{pi})/P)$
$q_m$—The transverse wave number in the direction normal to the grating $(q_m^2=K_m^2-W^2/c^2)$
D—Symbol of the dispersion function; D=0 is the dispersion relation Referring to FIG. 1, in a conventional Smith-Purcell beam/grating experiment, an electron (e−), located at a height $x_o$ above a grating 10, is moving parallel to the surface 11 with a velocity cB. The coupling between the electron and the grating surface 11 will produce a spontaneous emission spectrum where the wavelength of the emitted radiation, the grating period, the electron velocity, and the angle of emission, are related by $$X = P(1/B - \sin T)$$

where X is wavelength, P is grating period, B is electron velocity relative to the speed of light, and T is the angle of emission.

Figure 2:
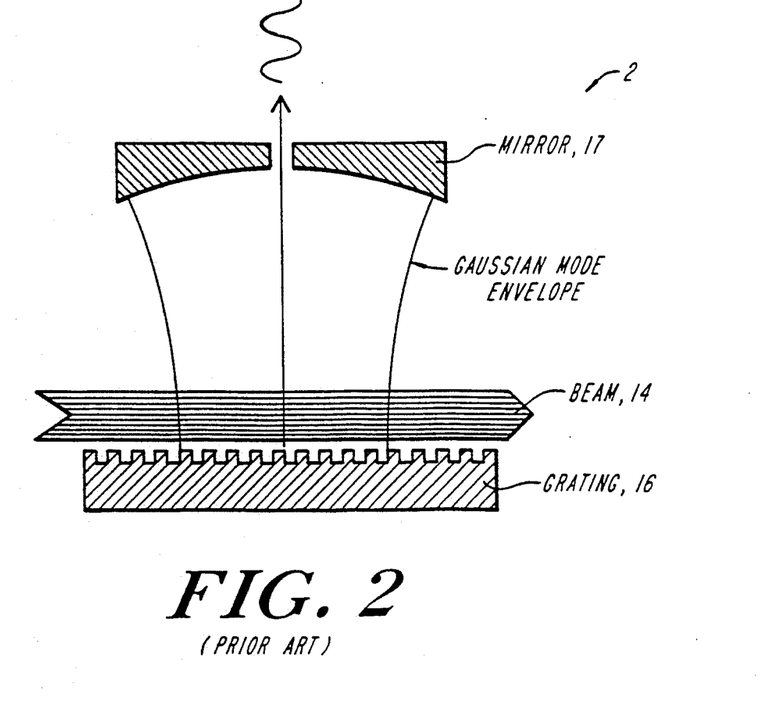
FIG. 2 depicts a prior art normal Orotron.

This principle is utilized in the normal Orotron 2 illustrated in FIG. 2. A beam of electrons 14 moves over the surface of a grating 16. Each electron produces a spontaneous emission spectrum. The total spontaneous emission by the beam may be described as a "shot noise" process. In the normal Orotron, emission from a small range of angles around T=0 is fed back onto the beam-grating system by an opposing—i.e., normal—mirror 17. When the feedback level is sufficient, the stimulated component of the emission process will add energy to the field at the expense of the beam energy. The process will continue until nonlinear effects saturate growth. In the normal Orotron, the wavelength, the grating period and the beam velocity are related by $$X = P/nB$$

where n is any integer $\geq 1$.

FIGS. 3A and 3B depict a conventional planar Orotron 3. In this device, the spontaneous emission over all angles T, for $\{-(\text{pi})/2 \leq T \leq (\text{pi})/2\}$ is contained by a plane conductor 18 opposing the planar grating 16. The structure is, in effect, a parallel plate waveguide with open sides. Feedback along an axis coincident with the direction of beam propagation is provided by cylindrical section mirrors M1 and M2. Apertures 19, 20 in the mirrors M1, M2 provide access and exit for the beam, and radiation is also extracted through the beam exit aperture 20. The planar Orotron effectively employs a wider range of emission angles than the normal Orotron, and thus it has a greater electronic tuning range.

Figure 4A:
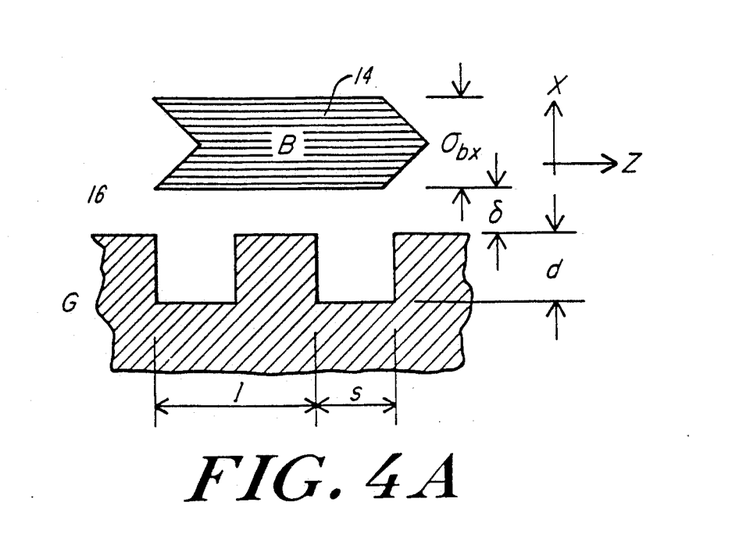
FIGS. 4A, 4B and 4C depict a grating coupled oscillator (GCO) constructed in accord with the invention, and the relationship between the beam and grating.
Figure 4B:
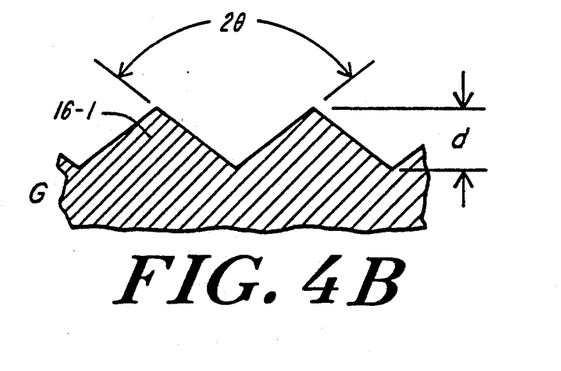
Figure 4C:
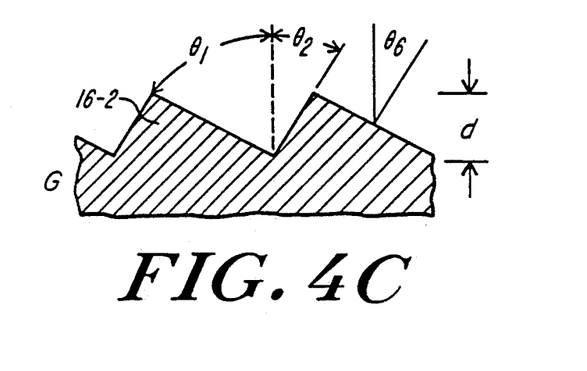

FIGS. 4A, 4B and 4C depict the relation of the beam and grating in a grating coupled oscillator constructed in accordance with the invention. A beam 14, having thickness $S_{bx}$ in the direction normal to the grating 16, moves over the grating 16 at near-grazing incidence. The beam-grating gap G should be smaller than $S_{bx}$, and in some instances, it may also be small in comparison with the grating period P.

Three typical grating profiles 16, 16.1, and 16.2, are shown in FIGS. 4A, 4B and 4C. The scale of the wavelength of the emitted radiation is controlled by the grating period alone, but as discussed in greater detail hereinafter, the coupling strength and feedback structures that are effective in a given instance are dependent upon the grating profile.

Figure 5:
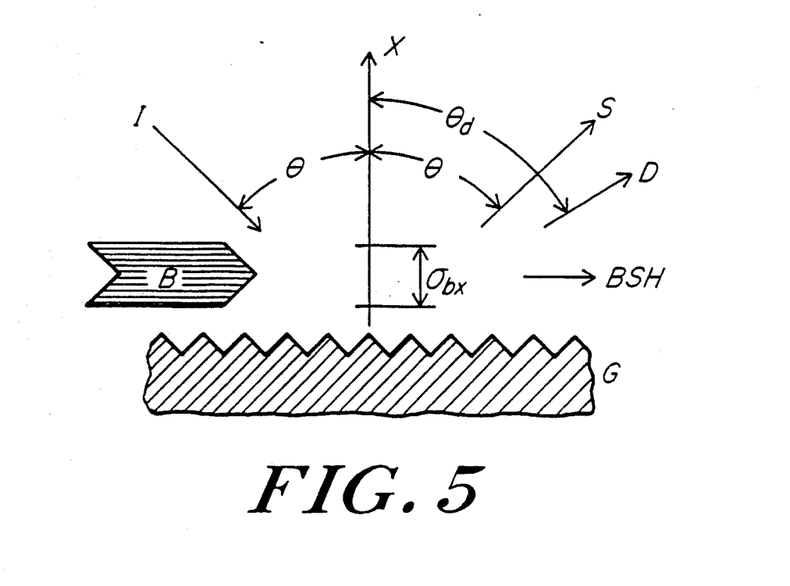
FIG. 5 depicts decomposition of the fields above a grating.

FIG. 5 depicts the decomposition of the fields above a grating. The fields above the grating may be generally decomposed into four major components: incident waves (I), specular components (S), diffracted components (D) of a reflected wave and an infinite set of periodic bound space harmonics (BSH). Thus, the radiative components exist together with a set of periodic space harmonics (BSH) produced by the modulation of the grating period, while the reflected wave is divided into specular (S) and diffracted (D) components. The periodic space harmonics result from the periodic boundary conditions on the grating surface. The phase velocity of each bound space harmonic is less than the speed of light and thus they may be velocity-matched to the electron beam.

In some configurations, the incident wave intensity may be zero. In such a circumstance, the outgoing wave is produced entirely by the electron beam moving over the surface. Other resonator/coupler configurations may employ both incoming and outgoing radiative wave components.

Dispersion

A single electromagnetic mode of the grating is identified by its angular frequency W and the infinite set of wave numbers $$K_m = K_o + 2m(pi)/P$$

where {(infinity) $\leq$ m $\leq$ (infinity)}. The axial wave numbers $K_m$ characterize the propagation of the wave along the surface. Each integer m (including m=0) is associated uniquely with a space harmonic and each space harmonic has a unique phase velocity $B_p$ expressed by the following equation:

$$B_p \approx W/cK_m$$

However, all space harmonics have the same group velocity, and thus the wave does not change its overall shape as it moves along the surface. When $$K_m > W/c$$

the associated space harmonic is bound to the surface and in general only $K_o$ may violate this condition. If $$K_o < W/c$$

then radiative components are present in the wave, and the operation of various GCO configurations will depend upon whether or not these components are contained by additional optical components.

Further understanding of GCO operation may be obtained by considering the dispersion relation satisfied by the grating modes. This function, which relates W and $K_m$, is a consistency condition imposed by matching the solutions of Maxwell's equations with the boundary conditions on the surface.

Figure 6:
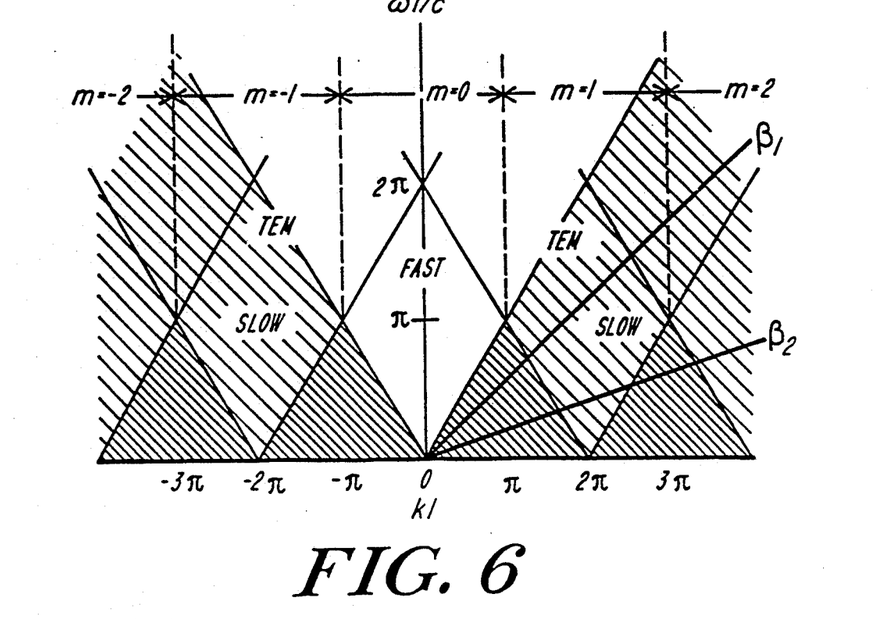
FIG. 6 depicts the dispersion plane.

It may be expressed symbolically in the form:

$$D[WP/c, K_mP, d/P, s/P, b/P] = 0$$

and in general it will have many branches, as indicated in FIG. 6. The particular form selected for this equation emphasizes the universal and self-similar properties of D. If all dimensions are changed in the same proportion as grating period P, then D remains invariant. Further, it is also obvious that the frequency and wavenumber of a particular mode will vary inversely in proportion with the period. The choice of variables d (slot depth), s (slot width), and b (the channel height) which appear in the equation are appropriate when a rectangular grating profile is employed. Suitable modifications for other profiles and boundary conditions are obvious. The universal and self-similar nature of D is an important tool in GCO design.

FIG. 6 depicts the dispersion plane WP/c - KP for a GCO constructed in accord with the invention. The plane is divided into regions in which the phase velocity of the fundamental wave component (m=0) is either fast or slow with respect to the speed of light. Boundaries of this region are defined by the TEM dispersion relation of the "light lines":

$$WP/c = \pm KP$$

Regions in which WP/c < KP (slow-wave regions) are shaded in FIG. 6. Periodic replications of the light lines are also shown in FIG. 6. The first intersection of this periodic array of lines form a set of triangular regions which are more heavily cross-hatched. Branches of the dispersion relation defined by D=0 which lie within these regions, will have no space harmonic components with a phase velocity greater than the speed of light. Hence they are non-radiative. These branches may be used to form a single-element GCO resonator. Branches of D=0 which fall outside of the heavily cross-hatched triangles will have at least one fast wave component. Formulation of a resonator with these modes requires the addition of at least one optical element.

A beam line defined by $$B = Wl/cKP$$

is also shown in FIG. 6. Since B is the relative velocity of a beam electron, it is necessarily less than unity. At points where B intersects branches of D=0, resonant coupling with the wave can be effected. These intersections may occur with any part of the slow wave portion of the first quadrant of the (Wl/c−KP) plane.

Tuning

An additional set of constraints are imposed when an electron beam is included in the analysis. The beam moves over the surface at grazing incidence and couples with slow space harmonics. These are the components of the wave which have phase velocity (W/K) less than the speed of light and which are thus bound to the surface (i.e., they are non-radiative).

The interaction strength of the electron beam with a spatial mode peaks near points where the beam velocity V (or B=v/c, c=the speed of light) is approximately equal to the phase velocities (W/K). Stated explicitly, the velocity match condition takes the form $$W = cKB$$

When used together with the dispersion relations, this equation defines the tuning relation as follows:

$$D_T[WP/c, WP/cB, d/P, s/P, b/P] = 0$$

Trajectories defined by this equation, when plotted as a function of the relative kinetic energy of a beam electron, $Y-1$, are in one-to-one correspondence with the dispersion relations $$Y = 1(1 - B^2)^{.5}$$

$$Y - 1 = eV_b/mc^2$$

where $e$ = the electron charge, $V_b$ = the voltage of the beam electrons, and $m$ = the rest mass of an electron. The tuning function associated with the dispersion relations displayed on FIG. 6 are shown on FIG. 7C. Since operation points are defined by the intersections of the "beam line" defined above with the trajectories on the $[wP/c - KP]$ dispersion plane, it is clear that there will exist many potential operating points which can be used in various embodiments.

Coupling

The relation between the beam and phase velocities may also be used to define two very useful dimensionless coupling constants. Each space harmonic component separately satisfies Maxwell's equations. Thus, it follows that in the triangular region of the dispersion plane defined by $$KP > WP/c$$

the transverse wavenumber has the form:

$$q = (K^2 - W^2/c^2)^{.5}$$

The variable $q$ characterizes the spatial variation of a slow space harmonic in the direction normal to the plane of the grating. In general, the space harmonic amplitude is greatest near the grating surface and diminishes with distance above the grating. Hence, $q^{-1}$ in cm is a measure of the spatial extent of a given space harmonic. Combining this equation with the beam gap, G, and the beam thickness, $s_{bx}$, defines two dimensionless coupling constants:

$$u(G) = 2qG$$

$$u(S_{bx}) = 2qS_{by}$$

These equations are measures of the degree of evanescence of the space harmonic over the gap and over a beam thickness, respectively. Invoking the velocity matching condition and the usual relation between the free-space wavelength X and the angular frequency W may be used to convert the evanescence equations into the more intuitive forms:

$$u(G) = 4(pi)G/xBY$$

$$u(Sbx) = 4(pi)S_{bx}/xBY$$

In general, it is possible by beam steering, to minimize the gap G such that the gap is much less than wavelength; i.e., $G << X$. The beam thickness, however, may not be made arbitrarily small. Thus, the latter equation represents a fundamental design formula relating the dimensionless evanescence scale (u), the operating wavelength, and the beam thickness to the beam kinematic parameters (BY):

$$uX/Sbx = 4(pi)/BY$$

The magnitude of the right-hand side of this equation is fixed by the relative kinetic energy of a beam electron $(Y-1)$. When $Y-1$ is small, much less than 1, the operating wavelength will be much greater than the beam thickness (u is typically set between 2 and 4). Short-wavelength operation in this case may be achieved with microscopic beams of the type produced by very-high-brightness field emission cathodes. Alternatively, beam generators of the higher energy $Y - 1 \leq 1$ are typical of those used in microwave tubes with moderate to high power output levels (W−kW) could be employed. Beam thickness can then be increased relative to the wavelength. It is also possible to adapt a beam produced by any high-energy accelerator $(Y-1 > 1)$ to the task of driving a GCO/GCA structure. In this case, operation with $X < S_{bx}$ may be achieved. Each alternative beam generator may offer distinct advantages in certain applications, as discussed in connection with the embodiments depicted in FIGS. 7–18.

Figures 7A, 7B:
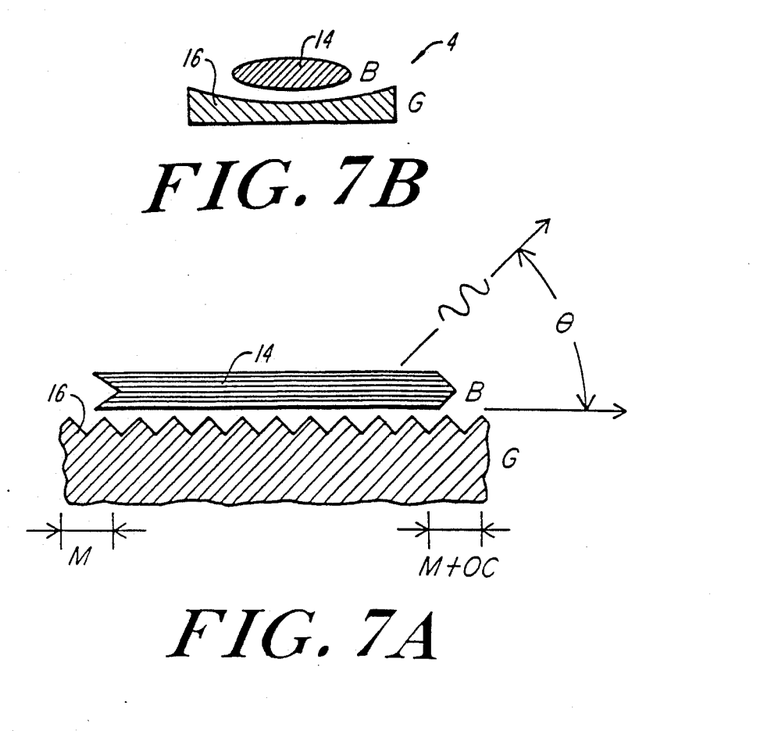
FIGS. 7A, 7B, and 7C depict a single-optical-element grating-coupled oscillator and its associated dispersion plane.
Figure 7C:
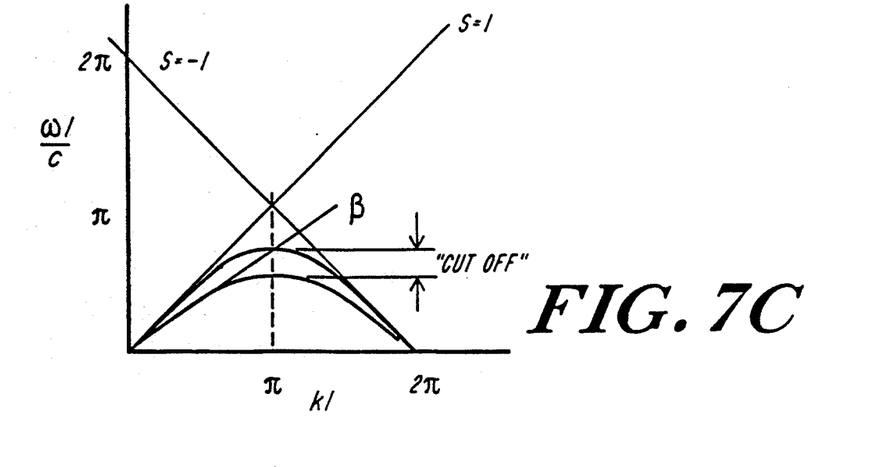

FIGS. 7A and 7B depict a single-optical-element grating coupled oscillator 4 constructed in accord with the invention, in which all essential resonator components are integrated on one optical element. The electron beam 14 moves over the grating 16 and excites the bound (non-radiative) surface wave. FIG. 7C depicts the relevant portion of the dispersion plane corresponding to the GCO of FIGS. 7A and 7B. The beam having velocity B intercepts a branch of $D=0$ within the non-radiative zone at a point near $KP = (pi)$. Wavelengths in a region around $$X = 2P/B$$

may be produced. Since the wave is non-radiative, it will experience an "open-circuit" reflection at the ends of the grating. The overall round-trip resonator phase condition may be expressed in terms of the forward $(K_o f)$ and backward $(K_o b)$ fundamental zone wave numbers $$(K_o f + K_o b)L = 2N(pi)$$

where N is an integer.

If needed or desired, additional reflection can be obtained by increasing the modulation depth on the grating. As illustrated in FIG. 7C, this has the effect of moving the operating frequency into a "cutoff" zone of the dispersion plane. Output coupling can be similarly effected by decreasing the modulation depth to zero over a small section near the end portion of the grating. In the single-element radiator, containment of the wave in the transverse direction is accomplished by curving the grating surface along the direction perpendicular to the axis of beam propagation, as indicated in FIG. 7B.

Figure 8A:
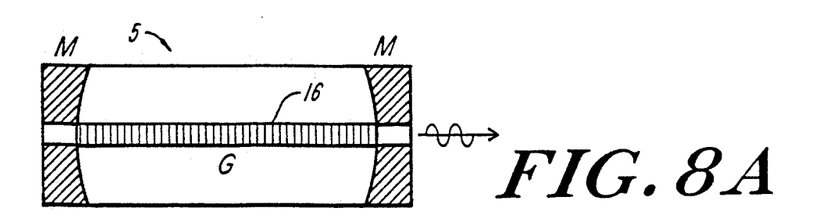
Figure 8B:
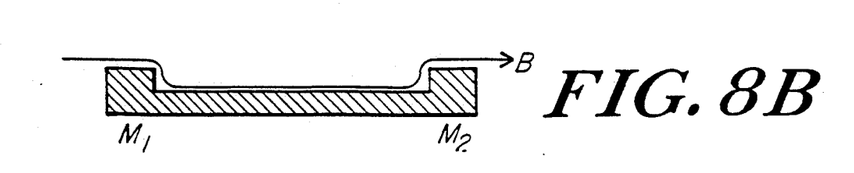
Figure 8C:
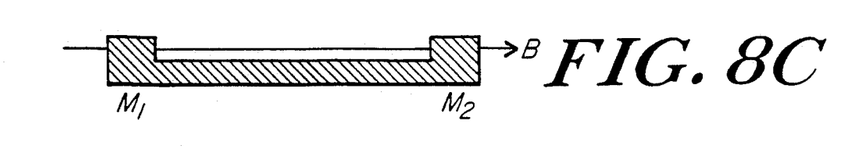
Figure 8D:
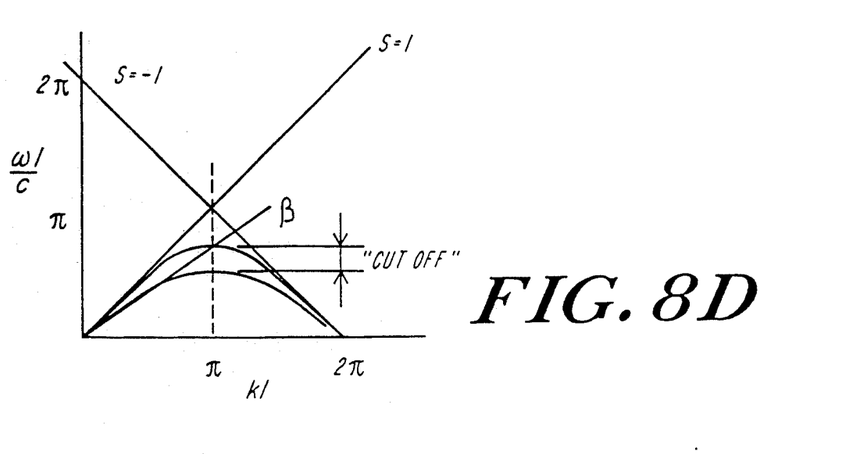

FIGS. 8A–8D depict an external mirror open resonator 5. An open, planar strip grating 16 may be employed as a coupling element in an open-surface resonator if transverse confinement of the mode is provided by external mirrors Ml, M2. Two options for the beam trajectory are illustrated in FIGS. 8B and 8C. In both options, the feedback and additional axis containment is provided by cylindrical section mirrors Ml, M2 (or by a cylindrical section mirror and a plane mirror). The beam may enter the resonator over the mirror surface and be displaced toward the surface by magnetic field elements (not shown). Alternatively, the beam may be introduced through apertures in the resonator. Output coupling may again be accomplished by tapering the modulation depth.

Figure 9A:
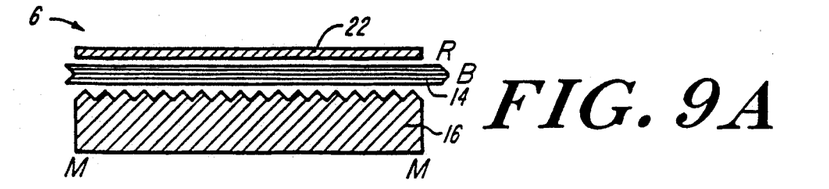
FIGS. 9A, 9B, and 9C depict a parallel trough guide resonator and its associated dispersion plane.
Figure 9B:
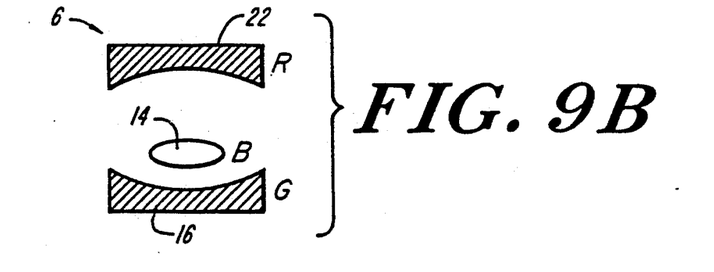
Figure 9C:
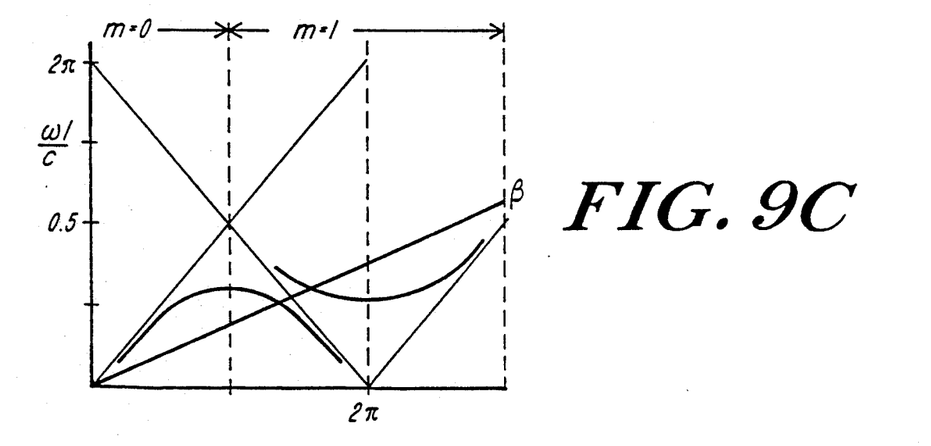

FIGS. 9A-9C depict a parallel trough guide resonator 6, formed by a pair of opposing trough surfaces 16, 22, one of which includes an embedded grating 16. The relevant portions of the dispersion plane are also illustrated in FIG. 9C. Again, it is possible to drive the modes in the non-radiative zone, but in addition, access to any point on the plane where $$KP > WP/c$$

is now possible. Feedback in the non-radiative zone is provided by the open circuit reflection or by additional increase in the modulation depth. In the radiative zone, feedback must be provided by further modification of the structure; one option is shown on the inset. Over the main section of the guide structure the interaction occurs along branch (1) of the dispersion, but in a tapered end section the operating point is shifted toward $KP = 2(pi)$, which provides the desired reflection. It is noted that this condition could also be achieved by modification of the grating.

Figure 10A:
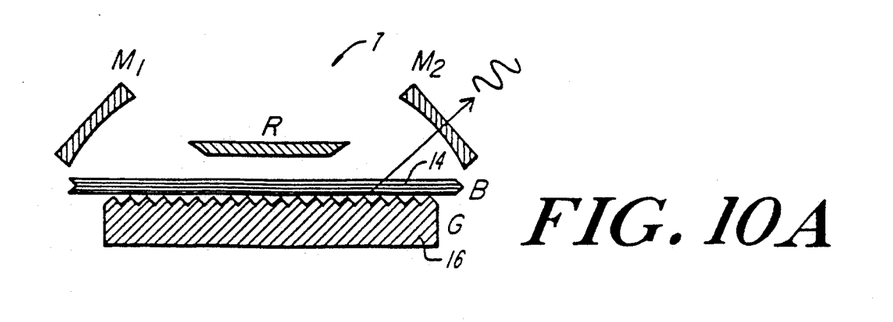
FIGS. 10A and 10B depict a partially-covered trough guide resonator with external mirrors and its associated dispersion plane.
Figure 10B:
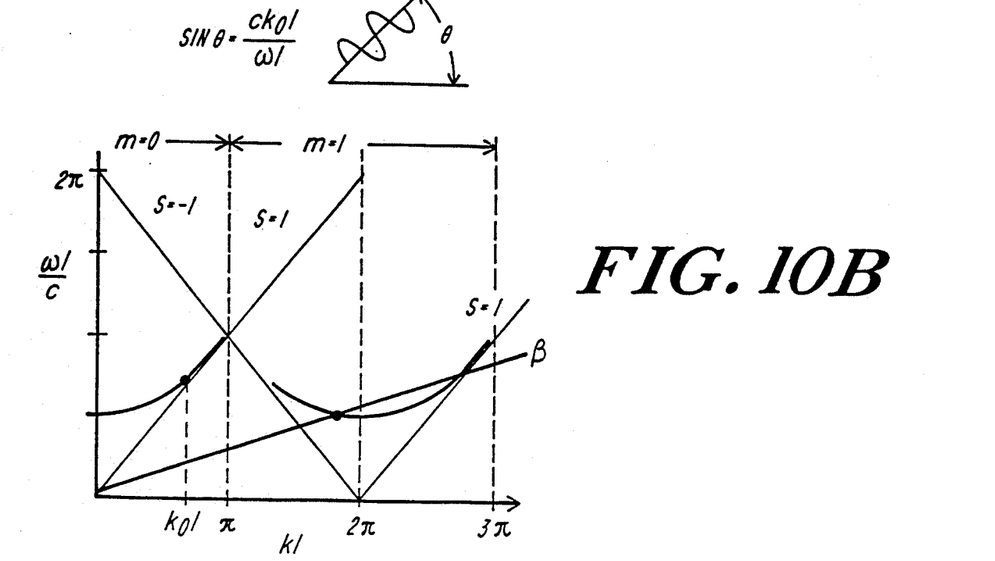

Feedback for a trough guide resonator may also be provided by external mirrors. FIGS. 10A-10B depict such a configuration; specifically, a partially covered trough guide resonator 7 with external mirrors M1, M2. End portions over the grating 16 are uncovered and radiation from branches of the dispersion with a space harmonic component in the fast-wave zone will be emitted. Feedback at the necessary angle is provided by external mirrors M1, M2. The relevant portions of the dispersion plane and the emission angle are indicated in FIG. 10B.

Figure 11A:
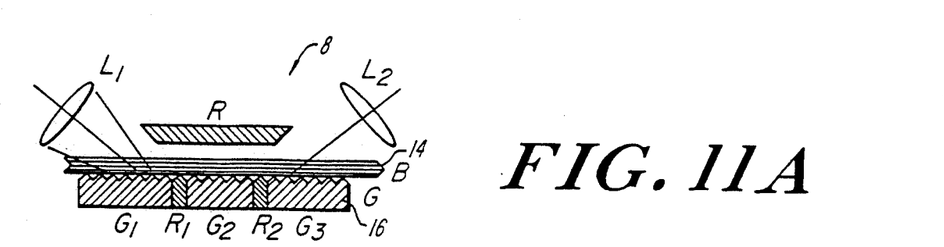
FIGS. 11A and 11B depict a grating-coupled amplifier (GCA) constructed in accord with the invention and the forward wave segments of dispersion relation.
Figure 11B:
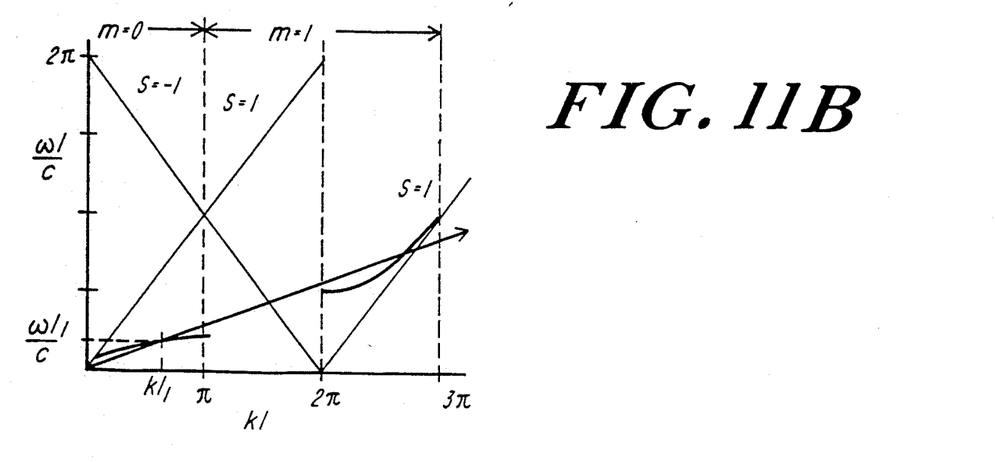

The coupling structure used for the partially-covered trough guide resonator of FIGS. 10A and 10B may also be used to form a grating-coupled amplifier (GCA) 8 in accord with the invention, as depicted in FIGS. 11A and 11B. In this embodiment, mirrors M1 and M2 are replaced by the input and output couplers indicated schematically in FIG. 11A by lenses $L_1$ and $L_2$, respectively. The wave incident on the grating 16 through $L_1$ will grow convectively along the direction of beam propagation. This growth will occur along forward portions of the dispersion curves and two possibilities are indicated on the figure. Growth of absolute instabilities at frequencies where backward propagating intercepts occur is suppressed by the addition of lossy sections indicated schematically by reference characters ($R_i$) at appropriate intervals. It is also noted that the electronic efficiency of the amplifier may be enhanced by tapering the grating parameters ($G_i$) in the sections separated by the lossy elements.

Figure 12A:
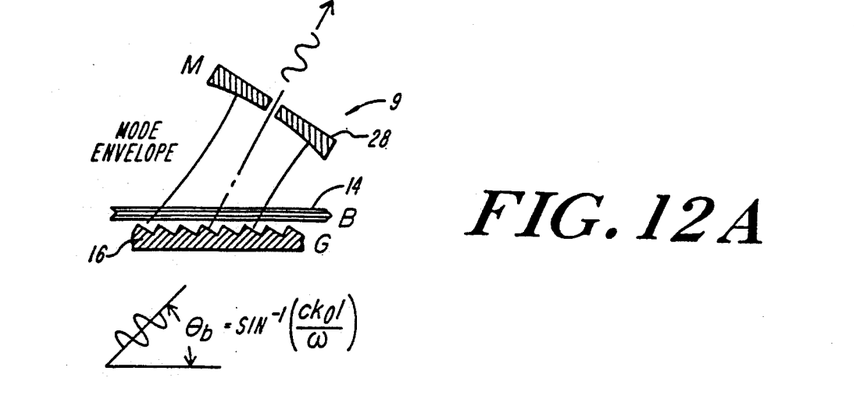
FIGS. 12A and 12B depict a Littrow configuration GCO constructed in accord with the invention and the associated dispersion relation.
Figure 12B:
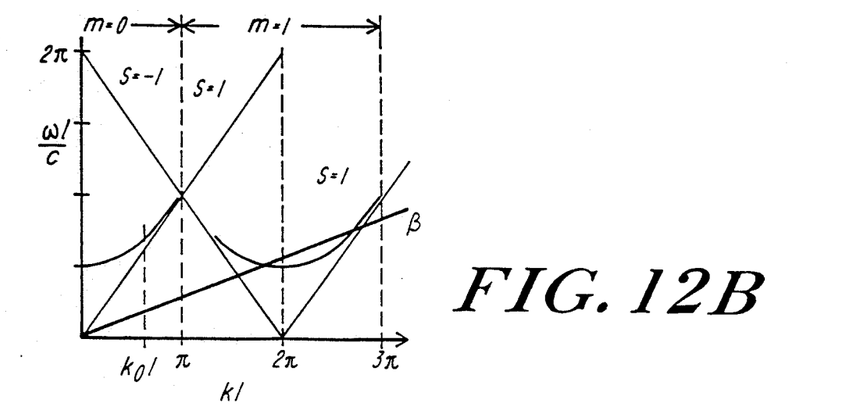

As indicated in FIG. 12A, a resonator 9 which is suitable for a GCO may also be formed with a blazed grating 16 and a single mirror 28 placed at the blazed angle. This is referred to herein as a Littrow Configuration GCO. The blaze angle $T_b$, and the operating point on the dispersion plane are related by the equations $$\sin T_b = cK_o/w$$

and $$1/B = (c(K_o P + 2m(pi)))/wP$$

The operating wavelength is then given by $$X = P/m \, (1/B - \sin T_b)$$

which is the Smith-Purcell relation. The importance of blaze angle is made clear in this configuration. The arrangement depicted in FIG. 12A is utilized for forward-angle emission. Those skilled in the art will appreciate that a complementary geometry can be utilized for backward-angle emission.

When the blaze angle is matched to the operating point on the dispersion plane, only a small part of the reflected radiation is re-emitted at the angle $-T_b$. If desired, this component can be used for output coupling.

Figure 13A:
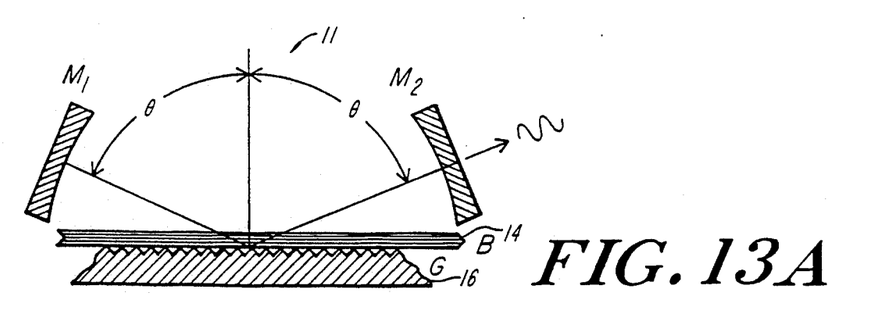
FIGS. 13A and 13B depict two triangular blaze two-mirror resonator structures.
Figure 13B:
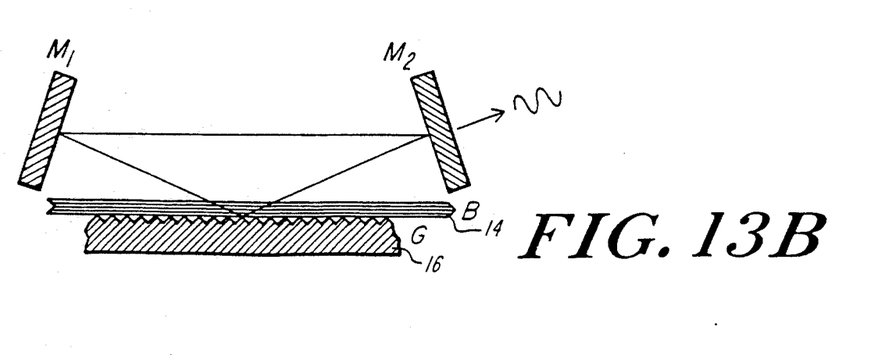

FIG. 13A depicts a triangular-blaze two-mirror resonator, illustrating how a second mirror M2 placed at a complementary angle over a triangular-blaze grating 16 may be used to form a two-mirror Littrow-type GCO resonator 11. This configuration can be modified to extend this type of resonator to grazing incidence or ring-resonator operation, as indicated in FIG. 13B.

Figure 14:
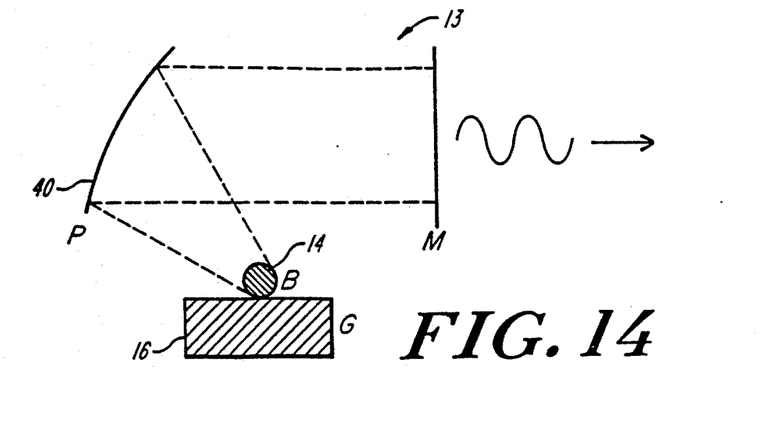
FIG. 14 depicts an off-axis paraloloidal GCO resonator constructed in accord with the invention.

FIG. 14 depicts an off-axis paraboloidal GCO resonator, in which an off-axis paraboloidal mirror 40 and a plane mirror M cooperate with a grating 16 to form a GCO resonator 13. A beam 14 moves over the grating and the image of the beam on the grating surface is placed near the focus of the paraboloid. The emission from this effective line source is converted to a plane wave by the paraboloid. Partial feedback, as required, is provided by the plane mirror M.

Figure 15:
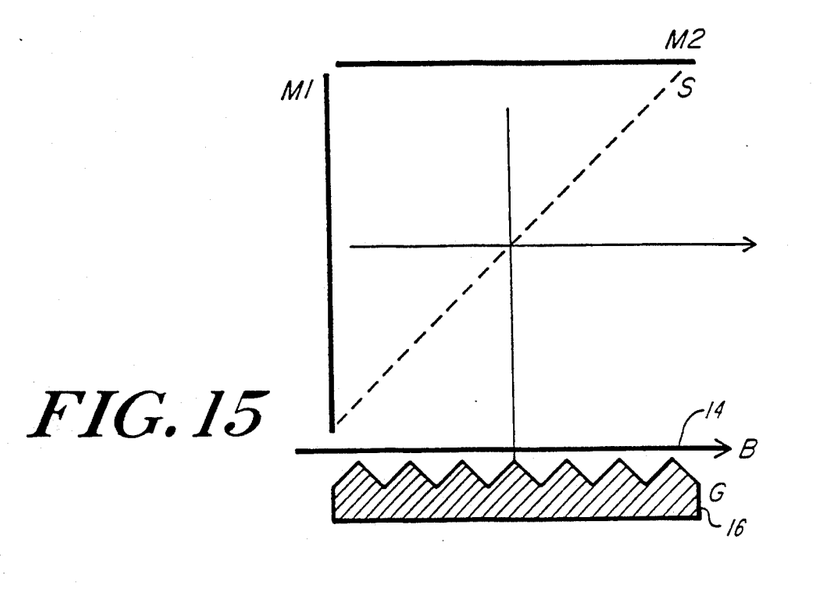
FIG. 15 depicts a Michaelson resonator embodiment of the invention.

FIG. 15 depicts another embodiment of a GCO resonator constructed in accord with the invention, utilizing Michaelson interferometer geometry adapted to GCO resonator operation. This configuration is particularly well adapted to the task of output coupling in a high-gain GCO.

Figure 16:
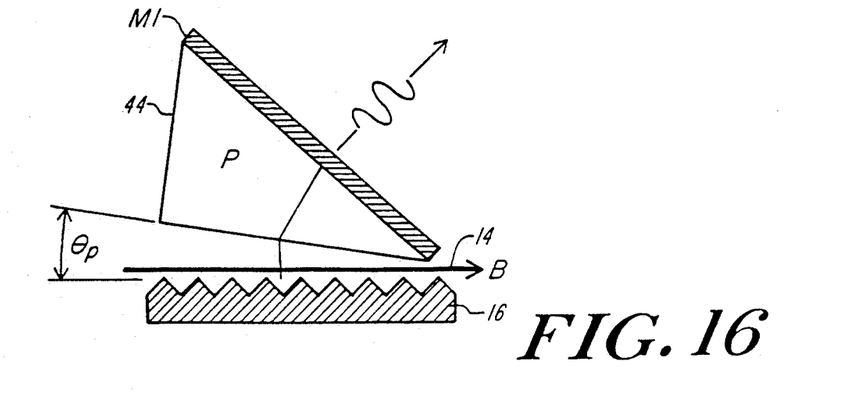
FIG. 16 depicts a prism-mirror GCO resonator.

FIG. 16 depicts a prism-mirror GCO resonator, in which a prism 44 is used as a mirror and output coupler. Tuning of the output wavelength may be accomplished by varying the angle between the prism and grating surfaces.

Figure 17:
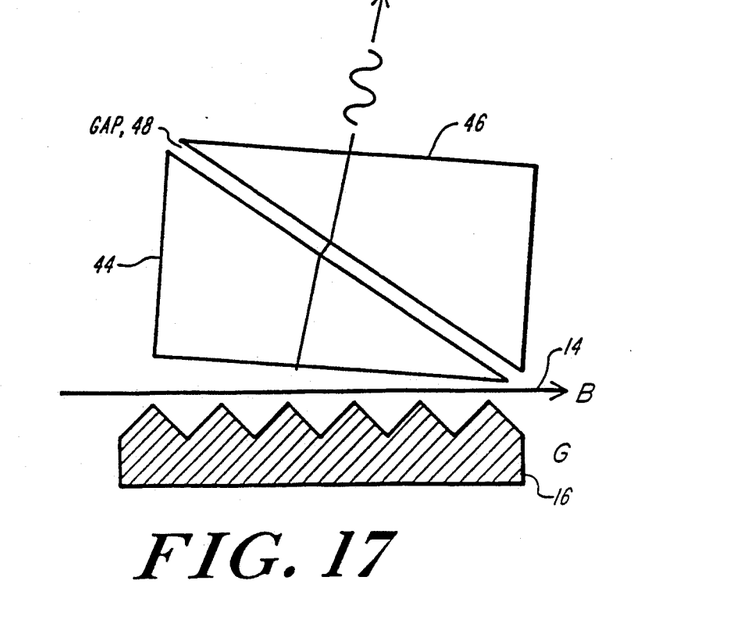
FIG. 17 depicts FTIR prism couplers that can be utilized in connection with the invention.

FIG. 17 depicts a frustrated total internal reflection (FTIR) prism coupler. When the angle of the radiation incident on the face of prism 44 is beyond the angle of total reflection, the feedback level may be controlled by placing a second prism 46 at a selected gap or displacement 48 which partially frustrates the internal reflection process.

Figure 18A:
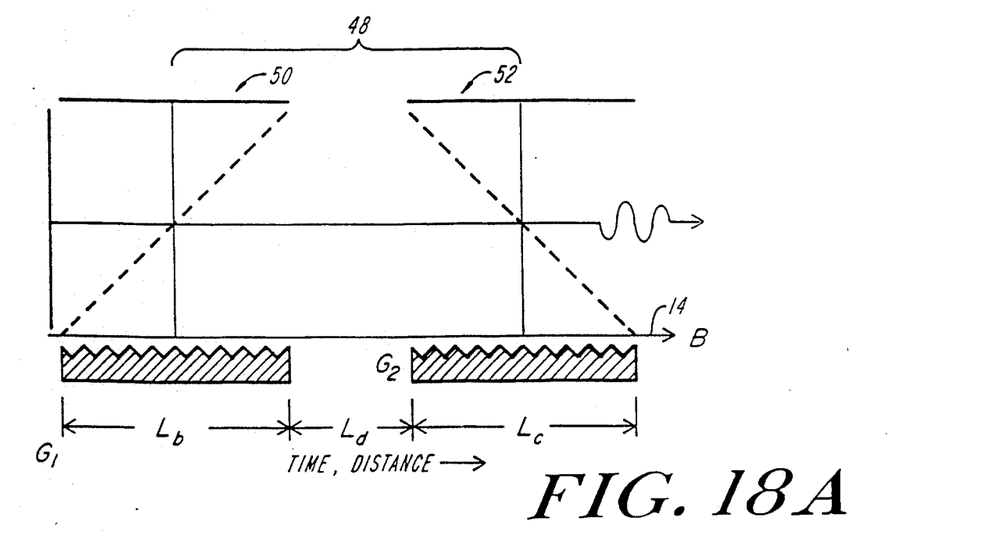
FIGS. 18A and 18B depict a grating-coupled klystron configuration GCO resonator constructed in accord with the invention.
Figure 18B:
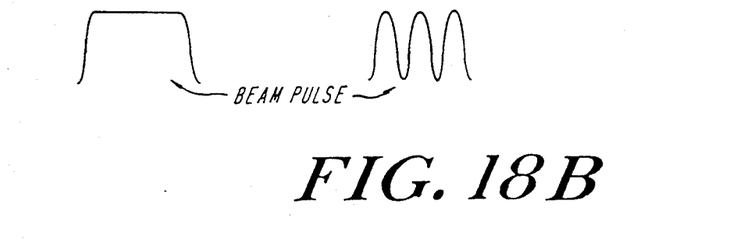

FIGS. 18A and 18B depict a Klystron Configuration GCO resonator 48, in which separate GCO structures 50, 52 are coupled to effect a klystron configuration. In the embodiment illustrated in FIG. 18, a totally reflecting mirror M couples the buncher stage emission from GCO 50 with the catcher stage emission from GCO 52 using a beam splitter S. Those skilled in the art will appreciate that other coupling structures illustrated in FIGS. 7-17 could also be adapted for use in multi-stage klystron configurations.

In view of the embodiments illustrated in FIGS. 7-18, those skilled in the art will appreciate that the grating-loaded, open or quasi-optical resonator, is a flexible means of effecting beam coupling. It is particularly useful when operation at millimeter and shorter wavelengths is desired.

It will thus be seen that the invention efficiently attains the objects set forth above, among those made apparent from the preceding description.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. Laser apparatus for generating coherent electromagnetic laser radiation, said laser apparatus comprising
   resonator means for defining a resonant cavity in which stimulated radiation can propagate to generate coherent electromagnetic laser radiation, said resonator means including
   at least a first diffraction grating means for defining a geometrically periodic coupling structure, and
   means for directing a beam of electrons over said diffraction grating means to excite an electromagnetic field through which said electron beam propagates, said beam of electrons having a beam thickness selected relative to the wavelength of said coherent electromagnetic laser radiation,
   said grating means and said beam directing means being adapted to produce interaction between said beam and said electromagnetic field for generating stimulated radiation,
   so that said stimulated radiation propagates in said resonant cavity to generate coherent electromagnetic laser radiation.

2. Apparatus according to claim 1 wherein said resonator means further comprises
   field confinement means for confining said electromagnetic field.

3. Apparatus according to claim 1 wherein
   said diffraction grating means comprises
   integral field confinement means for confining said electromagnetic field.

4. Apparatus according to claim 3 wherein
   said diffraction grating means comprises a diffraction grating element having a substantially cylindrical cross section over at least a portion of said element,
   said diffraction grating element including
   integral mirror elements and an output coupler element.

5. Apparatus according to claim 2 wherein
   said field confinement means comprises
   external confinement means disposed in selected proximity to said diffraction grating means, and
   said diffraction grating means includes
   a diffraction grating element
   having any of a substantially planar cross section or a substantially cylindrical cross section over at least a portion of said diffraction grating element.

6. Apparatus according to claim 5 wherein
   said external confinement means comprises external coupling elements including
   gratings, prisms, or mirrors to provide any of field confinement or output coupling.

7. Apparatus according to claim 3 wherein
   said diffraction grating means includes
   a diffraction grating element having a substantially cylindrical cross section over at least a portion of said diffraction grating element,
   said integral field confinement means in said diffraction rating means includes
   integral reflector elements,
   and further comprising
   external confinement means for confining said electromagnetic field, said external confinement means including
   a guide element, disposed substantially parallel to said diffraction grating element and having a substantially smooth surface and a substantially cylindrical cross section over at least a portion of said guide element.

8. Apparatus according to claim 2 wherein
   said diffraction grating means comprises
   a first diffraction grating element
   having a substantially cylindrical cross section over at least a portion of said diffraction grating element,
   said field confinement means comprises
   a guide element,
   disposed proximate to and in facing relation to said first diffraction grating element,
   said guide element having a substantially smooth surface facing said first diffraction grating element and a substantially cylindrical cross section along at least a portion of said guide element,
   said guide element partially covering said first diffraction grating element so that at least a portion of said first diffraction grating element is substantially covered by said guide element,
   said covered section of said first diffraction grating element being operable as an output coupler for said coherent electromagnetic laser radiation.

9. Apparatus according to claim 8, wherein
   at least one portion of said first diffraction grating is uncovered by said guide element, and
   said at least one uncovered portion is operable as an input coupler for an amplifier.

10. Apparatus according to claim 1, wherein
    said resonator means comprises
    first and second opposing diffraction grating means, each of said diffraction grating means including
    a diffraction grating element having a substantially cylindrical cross section along at least a portion of each diffraction grating element and gratings with a selected grating period,
    said respective gratings of said first and second diffraction grating means being in selected registration with each other.

11. Apparatus according to claim 10 wherein
    said gratings of said first diffraction grating means are offset from said gratings of said second diffraction grating means by a selected offset amount.

12. Apparatus according to claim 2 wherein
    said diffraction grating means comprises
    an open diffraction grating element,
    said grating element including gratings having a selected blaze angle, and said field confinement means comprises
a first mirror element disposed in opposition to said open diffraction grating element at an angle substantially equal to said blaze angle, to form a Littrow optical configuration.

13. Apparatus according to claim 12 wherein said confinement means further comprises
a second mirror element disposed at a complementary angle to said first mirror element to form a complementary Littrow optical configuration.

14. Apparatus according to claim 1 further comprising
plural resonator means, each for defining a resonant cavity in which stimulated radiation can propagate to generate coherent electromagnetic laser radiation, each of said resonator means including
at least a first diffraction grating means for defining a geometrically periodic coupling structure, and
coupling means for optically coupling said plural resonator means, said coupling means including
reflecting means for reflecting radiation emitted by at least one said resonator means.

15. Apparatus according to claim 14, wherein said reflecting means includes
mirror means for coupling radiation emitted by a first one of said plural resonator means with radiation emitted by a second one of said plural resonator means.

* * * * *